United States Patent [19]

Buchanan, Jr. et al.

[11] Patent Number: 5,582,279
[45] Date of Patent: Dec. 10, 1996

[54] ACCELERATION REACTION CLUTCH WITH OVERRIDE CAPABILITY

[75] Inventors: Harry C. Buchanan, Jr., Spring Valley, Ohio; James P. Penrod, Fort Thomas, Ky.

[73] Assignee: ITT Automotive Electrical Systems, Inc., Auburn Hills, Mich.

[21] Appl. No.: 501,557

[22] Filed: Jul. 12, 1995

[51] Int. Cl.⁶ .................................................. F16D 43/20
[52] U.S. Cl. ...................... 192/54.5; 192/104 B
[58] Field of Search ................... 192/54.5, 78, 76, 192/104 B, 105 BA, 105 BB, 74

[56] References Cited

U.S. PATENT DOCUMENTS

| | | | |
|---|---|---|---|
| 2,251,588 | 8/1941 | Gilbert | 192/54.5 |
| 2,753,031 | 7/1956 | Light | 192/104 B |
| 3,338,361 | 8/1967 | Hoff | 192/54.5 X |
| 3,971,492 | 7/1976 | Johansson | 192/103 BX |
| 4,296,852 | 10/1981 | Luerken | 192/104 B |
| 4,645,050 | 2/1987 | Ingenhoven | 192/54.5 X |
| 4,916,861 | 4/1990 | Schap | |
| 5,004,280 | 4/1991 | Schap | |
| 5,039,925 | 8/1991 | Schap | |
| 5,066,056 | 11/1991 | Schap | |
| 5,096,035 | 3/1992 | Bradfield | 192/104 B |
| 5,105,131 | 4/1992 | Schap | |
| 5,325,947 | 7/1994 | Campbell | 192/54.5 |

*Primary Examiner*—Charles A. Marmor
*Assistant Examiner*—Saul Rodriguez
*Attorney, Agent, or Firm*—Robert P. Seitter; J. Gordon Lewis

[57] ABSTRACT

A clutch selectively transmits torque and rotary motion from a spindle having an axis of rotation to a drum. First and second shoe members disposed radially between the spindle and the drum move radially with respect to the axis of rotation between an engaged position and a disengaged position with respect to the drum. The first and second shoe members are responsive to acceleration for moving into the engaged position and responsive to rotational speed for moving into the disengaged position. A biasing spring normally maintains the first and second shoe members in the disengaged position when the spindle is at rest.

20 Claims, 3 Drawing Sheets

ACCELERATION REACTION CLUTCH WITH OVERRIDE CAPABILITY

FIELD OF THE INVENTION

The present invention relates to a clutch for selectively transmitting torque and rotary motion from a spindle having an axis of rotation to a drum, and in particular, is responsive to acceleration to engage the clutch and responsive to rotation speed to disengage the clutch during operation.

BACKGROUND OF THE INVENTION

Present clutch technology uses acceleration and centrifugal action to engage the clutch, but once engaged the clutch cannot be disengaged while being rotated at a rotational speed (revolutions per minute) above the operating limits of the power source. This is due to centrifugal forces in the clutch. Other clutch devices use electro-mechanical solenoids which are difficult to disengage while a gear portion is under load. In automotive clutch applications, such as sliding doors, it is desirable to provide a power drive system for driving the sliding door in movement between an open position and a closed position, where the power drive system accommodates shifting between manual and positively driven powered operation of the door at any position along the path of movement.

SUMMARY OF THE INVENTION

While useful in other applications, the power drive system of the present invention is especially well adapted for use in operating the sliding door of a van-type vehicle. All power drive systems for sliding doors require a power system capable of driving an output member coupled to the door in either direction over a relatively long working stroke. In van-type vehicle applications of the power drive system, the sliding door is conventionally mounted at the passenger side of the van, but may also or alternatively be mounted on the driver's side, and a major convenience of the system is that it may be power operated by control switches accessible from the driver's seat. However, if the driver is outside the van loading or unloading articles through the sliding door, the power controls are out of reach and there are many occasions when in this situation, the driver will want to open or close the door manually. Additionally, there may be situations where it is desirable to override the speed of the door closing to manually close the sliding door faster than provided by the power drive system. If the door is positively mechanically linked to the power source of the drive, this connection will interfere with manual operation of the door. Therefore, it is desirable in the present invention to provide a clutch with override capability. Further, it is desirable in the present invention to normally maintain the clutch in a disengaged position. In addition, it is desirable in the present invention to cause the clutch to engage in response to acceleration of the power drive for the system.

The present invention uses centrifugal forces to disengage at high rotational speeds. Also, Coriolis acceleration component forces may be used in the present invention to assist in camming the clutch out of engagement, or into engagement. The present invention allows a motorized power drive system to be manually disengaged and manually overridden without harming the driving mechanism.

According to the present invention, a shaft driver or spindle engages a drum or cup driven through first and second clutch plates or shoes. The rapid acceleration of the motor spindle causes the first and second clutch plates to radially extend or expand to engage the drum. The present invention locates the respective center of gravities of the first and second clutch plates so that centrifugal force does not encourage coupling of the clutch. In fact, if the clutch is ever overridden, the contact force between the clutch plate and cup tends to zero causing the clutch to disengage. Additional mass or counterweights are provided in each clutch plate to ensure that the center of gravity of the clutch plate is less than the clutch plate throw or very close to zero when in a running condition. As force is applied by the spindle, the force overcomes the clutch plate inertia propelling the clutch plate radially outward as it rotates to contact the drum. The shaft of the motor only rotates, while the clutch plates simultaneously rotate and move radially outward. As the rotational speed increases, so does the centrifugal force, causing the contact force to decrease. Eventually the contact force goes to zero and the clutch is in effect disengaged. At this point, without other controls, the motor will accelerate to its free speed. The clutch should be designed such that this speed is high enough to "reset" the device to its initial configuration. The clutch according to the present invention disengages when an overrun is attempted, where an overrun is generally defined as a rotational speed approximately greater than the free motor speed or limiting/critical clutch disengagement speed.

In the present invention, a driver is attached to an output shaft of a motor. Clutch plates or shoes are initially resting against the driver by virtue of preloading by a spring (or springs). The present invention requires that the driver and shoes move relative to one another during startup, clutch engagement and overrun. Since the shoes are counterweighted such that the tendency of each shoe is to clamp against the driver as the angular speed is increased, the relative motion between the driver and the shoes must be initiated immediately at startup. The present invention requires the spring load that exists at startup and when the driver and shoes move together to be determined; and once this is known, the spring preload can be selected such that the desired relative motion between the driver and the shoes will occur. The clutch according to the present invention is evaluated as having two degrees of freedom.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 7:
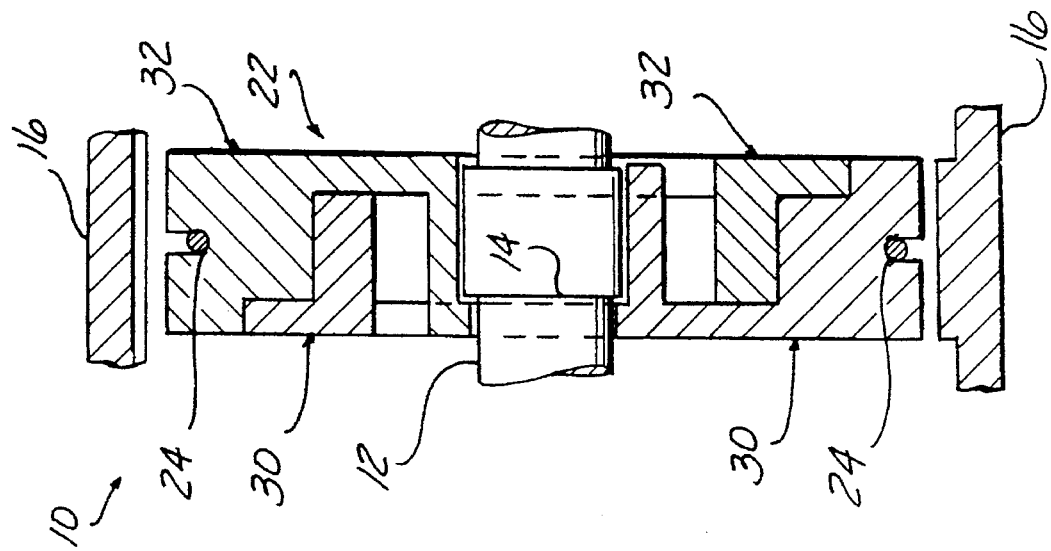
FIG. 7 is a cross-sectional view of the clutch according to the present invention in a disengaged position taken as shown in FIG. 1.
Figure 1:
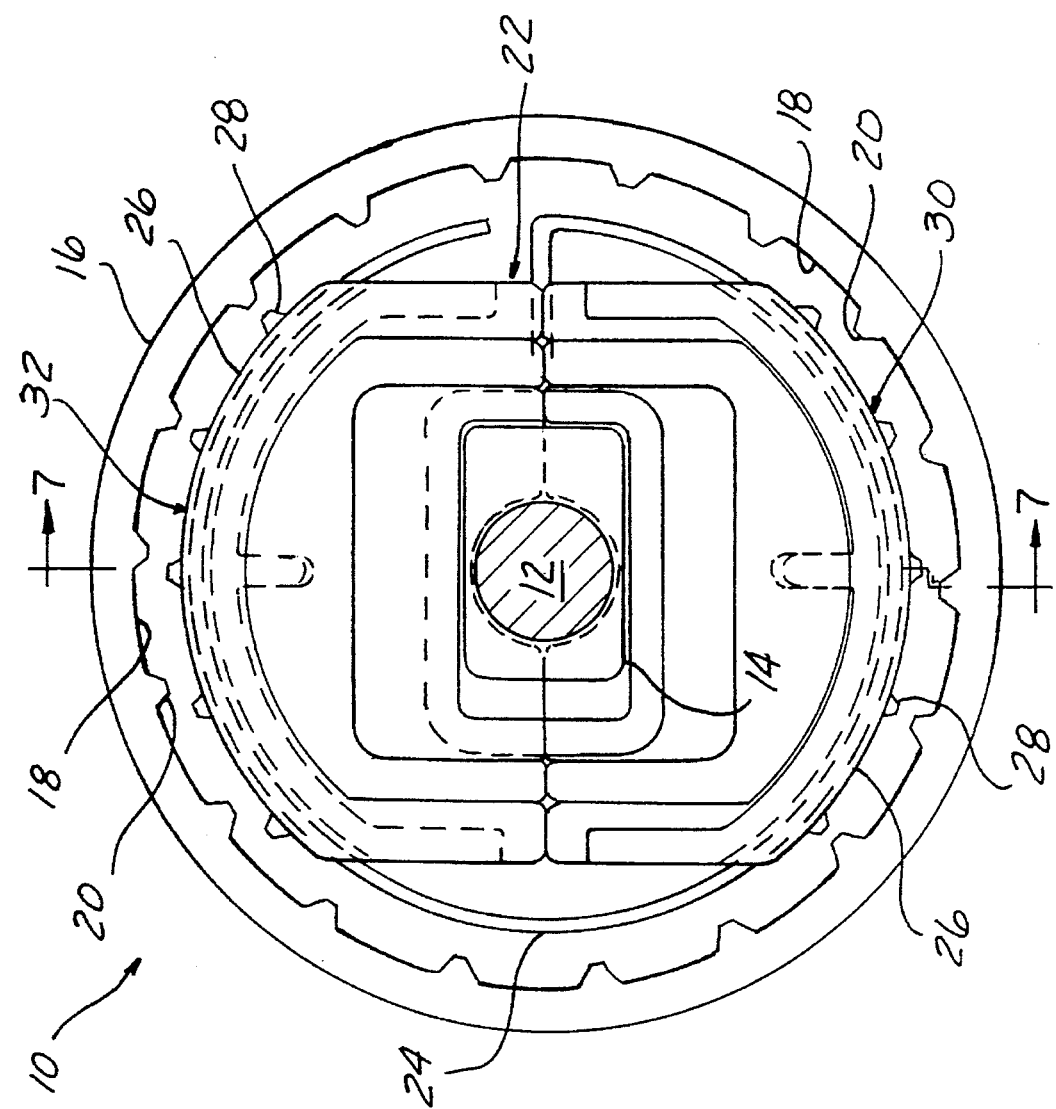
FIG. 1 is a side elevational view of a clutch according to the present invention in a disengaged position with certain portions removed for clarity.

The clutch 10, according to the present invention, includes a driven shaft or spindle 12 having a driver block 14 connected thereto. The spindle 12 is disposed within a rotatable cup or drum 16. The drum 16 may have a smooth interior surface 18, or may be formed with radially inwardly extending lugs or teeth 20 (or serrations).

Means 22 is disposed radially between the spindle 12 and the drum 16 for moving radially with respect to the axis of rotation of the spindle between an engaged position and a disengaged position with respect to the drum 16. The moving means 22 is responsive to acceleration of the spindle 12 for moving into the engaged position, and is responsive to high rotational speed for moving into the disengaged position. Biasing means 24 normally maintains the moving means 22 in the disengaged position when the spindle 12 is at rest. The moving means 22 preferably includes a radially expandable rim surface 26, sometimes referred to herein as an engagement surface or clutch surface, for engaging the interior surface 18 of the drum 16. The rim surface 26 may define a friction clutch surface for engaging the surface 18 of drum 16. The moving means 22 can alternatively include a positive engagement rim surface 26 having at least one radially extending lug, or a plurality of peripherally spaced, radially extending teeth 28 for engagement with the radially inwardly extending lugs or teeth 20 on the interior surface 18 of the drum 16.

The moving means 22 preferably includes at least one counterweighted shoe 30, and more preferably first and second counterweighted shoes 30 and 32, respectively, for collapsing radially inwardly against the driver block 14 of the spindle 12 in response to increased angular or rotational speed beyond a predetermined value. The predetermined value of angular or rotational speed generally corresponds to a rotational speed greater than a free motor speed of the spindle 12. In addition, the moving means 22 is weighted for moving radially outwardly into the engaged position in response to rapid angular acceleration, while also being counterweighted for moving radially inwardly into the disengaged position in response to high rotational speeds. By way of example and not limitation, the spindle according to the present invention is capable of a fast start or rapid angular acceleration, in the range of approximately 18,000 radians per second squared (radians/sec$^2$). Also by way of example and not limitation, the free-wheeling speed of the spindle 12 according to the present invention is in the range of approximately 3600 to 4000 revolutions per minute.

The moving means 22 preferably includes an engagement surface or rim surface 26 for contact with the drum 16 and a center of gravity 34, such that the axis of rotation of the spindle 12 is interposed diametrically between the engagement surface 26 and the center of gravity 34. In operation, the moving means 22 defines a clutch surface, such as rim surface 26, that disengages from the drum 16 in response to centrifugal force acting on the center of gravity 34 during overload or overrun conditions. In other words, the moving means 22 is operable such that the clutch surface 26 is responsive to centrifugal force and Coriolis force, created by radial acceleration of the center of gravity 34 diametrically opposed to the clutch surface 26, to release the clutch surface 26 from engagement with the interior surface 18 of the drum 16.

Referring now to FIGS. 3 through 6, the moving means 22 preferably includes first and second counterweighted shoes, 30 and 32 respectively. Each shoe includes an engagement surface, sometimes referred to herein as a clutch surface or rim surface 26. A spring groove 36 is formed in the face of the rim surface 26 for receiving and allowing passage of the biasing means 24. Axially extending wall means 38 define a driver block receiving pocket 40 for operably engaging the driver block 14 connected to the spindle 12 for transferring torque and rotary motion from the spindle 12 through the first and second shoes, 30 and 32 respectively, to the rotatable drum 16. The pocket 40 is oversized, and preferably complementary in shape to the driver block 14 sufficiently to allow limited relative rotation between the driver block 14 and the pockets 40 defined in each of the first and second shoes, 30 and 32 respectively. The pockets 40 may further be defined by a radially extending wall 42 having an arcuate cutout 44 allowing passage of the spindle 12 therethrough. The wall means 38 interacts with driver block 14 to cammingly urge the first and second shoes 30 and 32 radially outwardly in diametrically opposite directions in response to rapid acceleration of the spindle 12 during startup, thereby engaging the rim surface 26 with the interior surface 18 of the rotatable drum 16 for transmitting torque and rotary motion from the spindle 12 to the drum 16. Each counterweighted shoe 30 and 32 includes a counterweight 46 disposed diametrically opposite from the rim surface 26. The counterweights 46 are of sufficient size and density to shift the center of gravity 34 to a position diametrically opposite from the rim surface 26, so that centrifugal force created by high rotational speed acting on the counterweight 46 causes the rim surface 26 to move radially inwardly, and to disengage from the interior surface 18 of the drum 16. The center of gravity 34 is disposed on the opposite side of the rotational axis of the spindle 12 from rim surface 26, so that the rotational axis of the spindle 12 is interposed between the center of gravity 34 and the rim surface 26 for each of the first and second shoes, 30 and 32 respectively.

Figure 8:
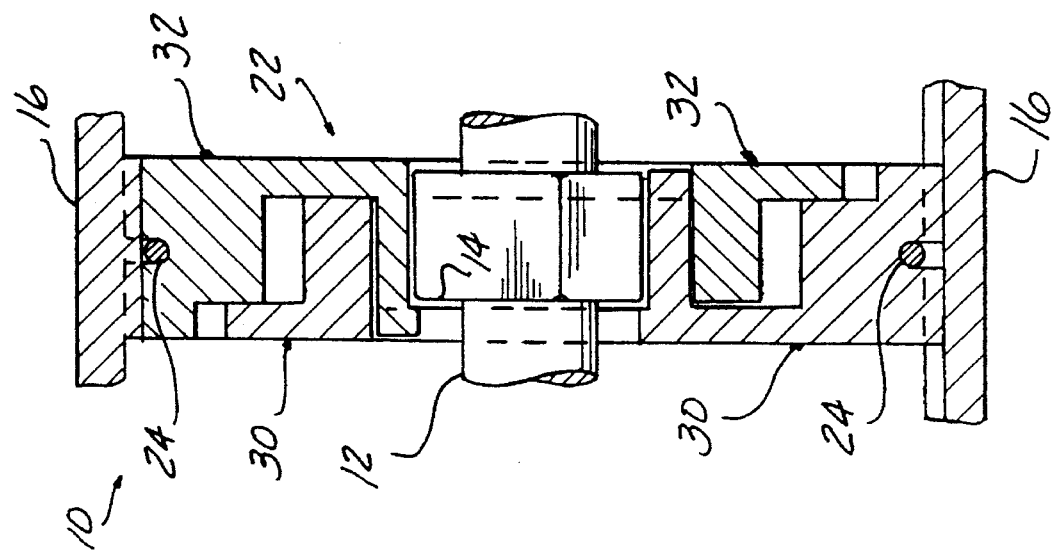
FIG. 8 is a cross-sectional view of the clutch according to the present invention in an engaged position taken as shown in FIG. 2.
Figure 2:
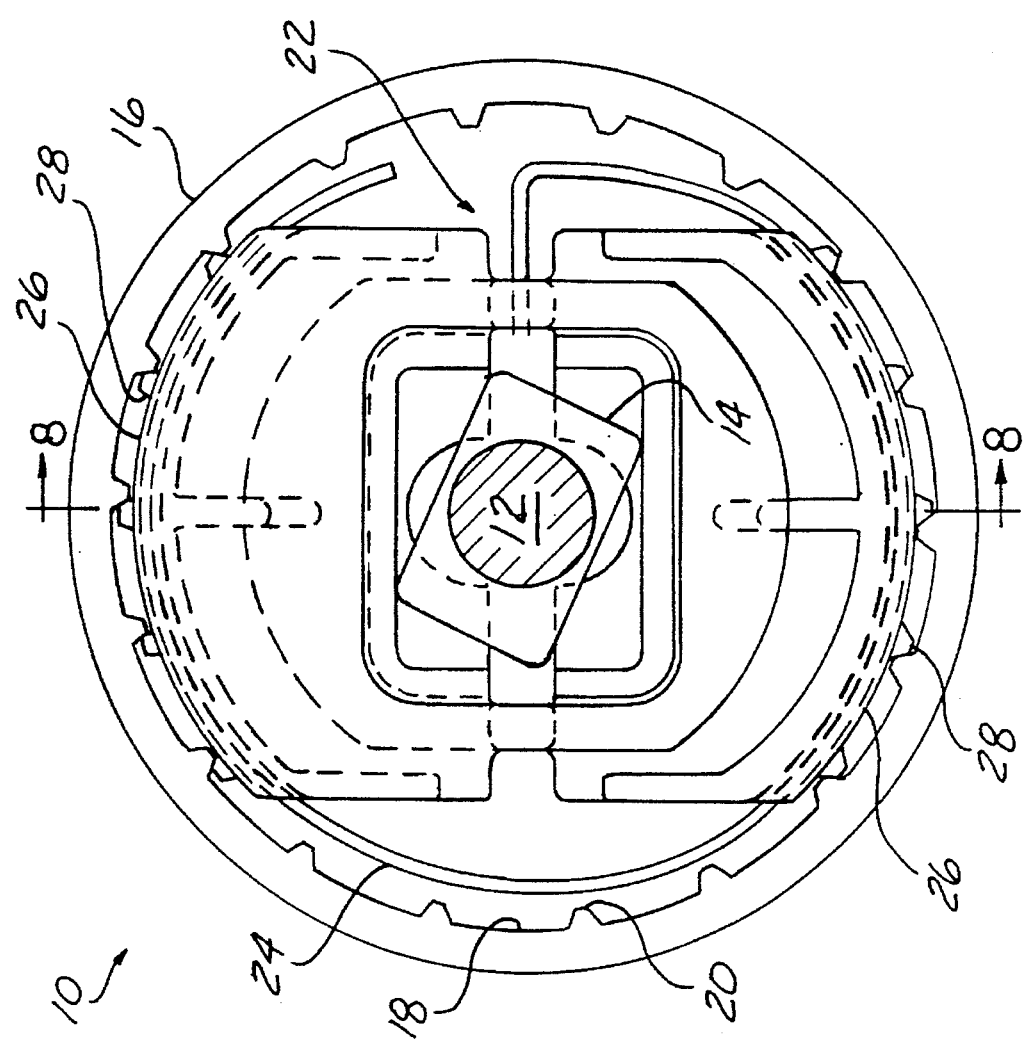
FIG. 2 is a side elevational view of the clutch according to the present invention in an engaged position with certain portions removed for clarity.
Figure 3:
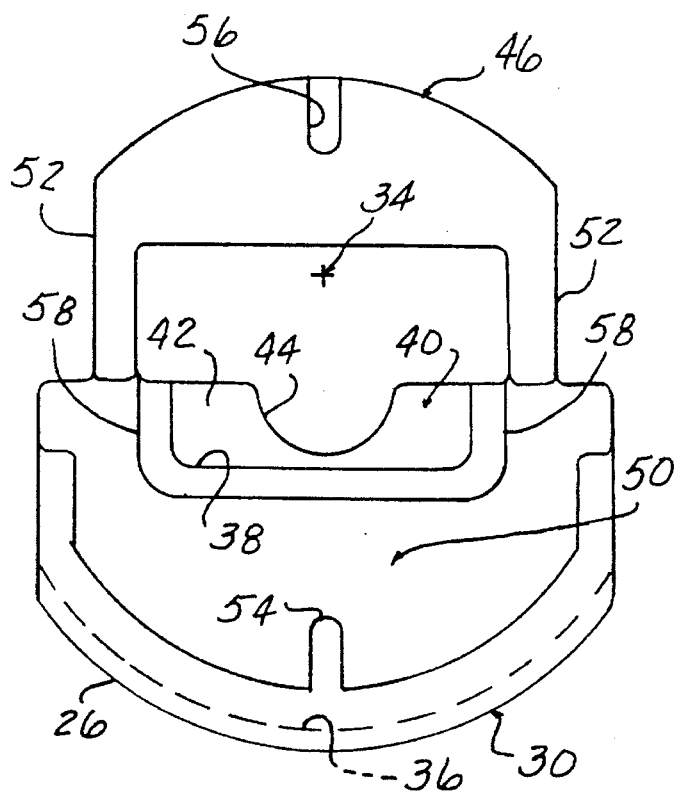
FIG. 3 is a plan view of a first clutch shoe according to the present invention.
Figure 4:
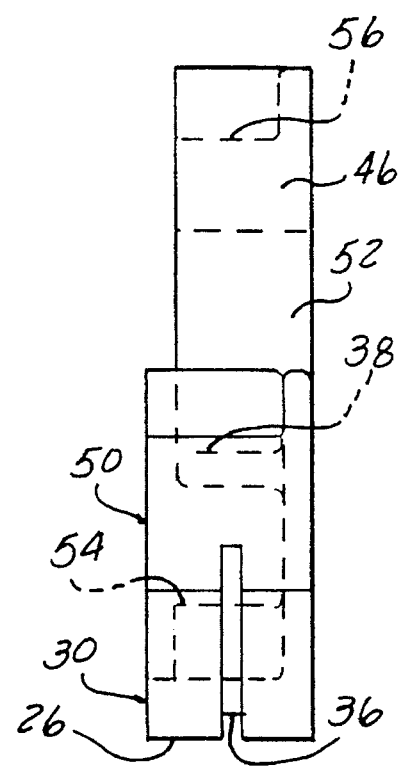
FIG. 4 is a side view of a first clutch shoe according to the present invention.
Figure 5:
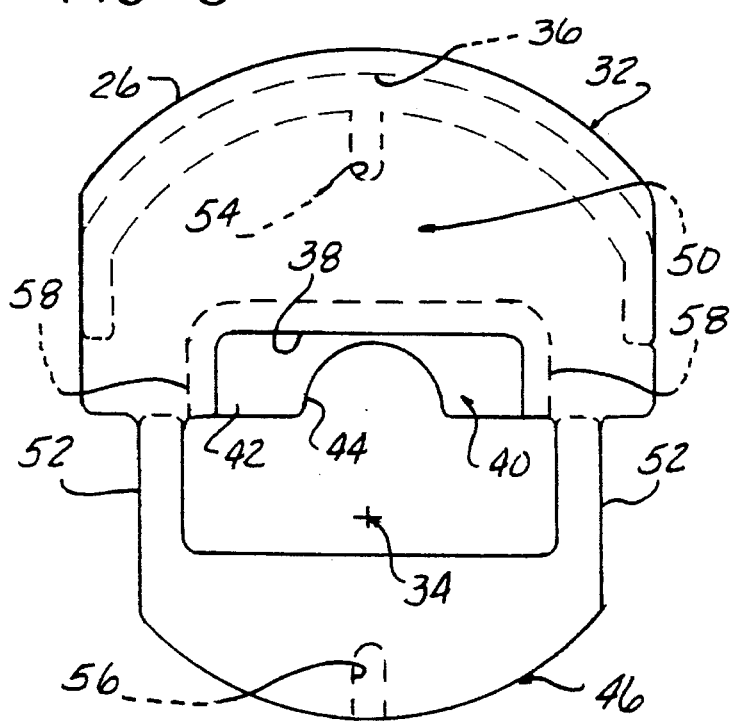
FIG. 5 is a plan view of a second clutch shoe according to the present invention.
Figure 6:
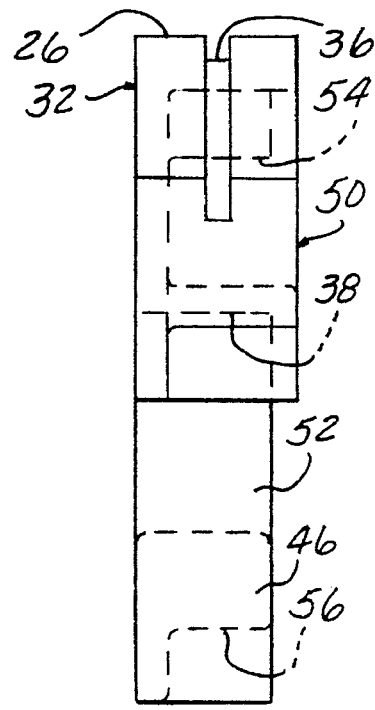
FIG. 6 is a side view of the second clutch shoe according to the present invention.

Guide means 48 is formed on each of the first and second shoes, 30 and 32 respectively, in order to guide the relative movement of the first and second shoes with respect to one another along a radially extending diameter extending from the axis of rotation of the spindle 12 and generally bisecting the peripheral arc of the rim surface 26 on each of the first and second shoes, 30 and 32 respectively. Each of the first and second shoes, 30 and 32 respectively, is formed with a counterweight receiving pocket 50 for receiving the counterweight 46 of the other shoe. The pocket 50 allows relative radial movement between the first and second shoes as best seen by comparing the disengaged position illustrated in the cross-sectional view of FIG. 7 with the engaged position illustrated in the cross-sectional view of FIG. 8. Each counterweight 46 is connected to the remaining portion of the shoe by at least one, and preferably two arms 52 extending from the counterweight 46 to the counterweight receiving pocket 50 of the shoe. The counterweight receiving pocket 50 has an alignment rib 54 extending radially inwardly therein. A rib receiving groove or aperture 56 is formed in the counterweight 46 of the other shoe. When the first and second counterweighted shoes, 30 and 32 respectively, are disposed in overlaying, overlapping relationship to one another, the counterweight 46 of the first shoe 30 is received within the counterweight-receiving pocket 50 of the second shoe 32 with the alignment rib 54 of the second shoe 32 slidably received within the aperture 56 of the first shoe 30, while the counterweight 46 of the second shoe 32 is received within the counterweight receiving pocket 50 with the alignment rib 54 of the first shoe 30 slidably received within the aperture 56 of the second shoe 32. In addition, the arms 52 of the first and second shoes slidingly engage along the external surface 58 of the wall means 38. The guide means 48 is defined by the interaction of arms 52 with external surfaces 58 and alignment rib 54 with aperture 56 of each of the first and second shoes, 30 and 32 respectively. More detailed descriptions of power drive systems for operating sliding door of a van-type vehicle can be found in U.S. Pat. No. 4,916,861; No. 5,004,280; No. 5,039,925; No. 5,066,056 and No. 5,105,131 which are incorporated herein by reference.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A clutch for selectively transmitting torque and rotary motion from a spindle having an axis of rotation to a drum comprising:

means disposed radially between said spindle and said drum for moving radially with respect to said axis of rotation between an engaged position and a disengaged position with respect to said drum, said moving means responsive to acceleration for moving into said engaged position and responsive to rotational speed for moving into said disengaged position; and biasing means for normally maintaining said moving means in said disengaged position when said spindle is at rest.

2. The clutch of claim 1 further comprising:

said moving means including a counterweighted shoe for collapsing radially inwardly against said spindle in response to increased angular speed beyond a predetermined value.

3. The clutch of claim 1 further comprising:

said moving means including a rim surface for engaging said drum.

4. The clutch of claim 3 further comprising:

said rim surface defining a friction clutch surface for engaging said drum.

5. The clutch of claim 3 further comprising:

said drum having at least one radially inwardly extending lug formed thereon for engagement with said moving means; and said rim surface of said moving means including at least one radially outwardly extending tooth for engagement with said lug of said drum when in said engaged position.

6. The clutch of claim 1 further comprising:

said moving means including a radially expanding rim surface for engagement with said drum.

7. The clutch of claim 1 further comprising:

said moving means including a positive engagement surface for engagement with said drum.

8. The clutch of claim 7 further comprising:

said positive engagement surface including at least one radially extending lug for engagement with said drum.

9. The clutch of claim 7 further comprising:

said positive engagement surface including a plurality of peripherally spaced, radially extending teeth for engagement with said drum.

10. The clutch of claim 1 further comprising:

said spindle capable of rapid angular acceleration during startup movement; and said moving means weighted for moving radially outwardly into said engaged position in response to rapid angular acceleration and counterweighted for moving radially inwardly into said disengaged position in response to high rotational speeds.

11. The clutch of claim 1 further comprising:

said moving means including an engagement surface for contact with said drum and a center of gravity, wherein said axis of rotation is interposed diametrically between said engagement surface and said center of gravity.

12. The clutch of claim 1 further comprising:

said moving means operable such that a clutch surface disengages said drum in response to centrifugal force during overload conditions.

13. The clutch of claim 1 further comprising:

said moving means operable such that a clutch surface is responsive to centrifugal force to release said clutch surface from engagement with said drum.

14. The clutch of claim 1 further comprising:

guide means for guiding radial movement of said moving means with respect to said drum.

15. The clutch of claim 14 further comprising:

said guide means including a radially extending rib slidably receivable within a complementary radially extending groove for maintaining radial alignment of said moving means during radial movement.

16. A clutch for selectively transmitting torque and rotary motion from a spindle having an axis of rotation to a drum comprising:

first and second clutch shoes disposed radially between said spindle and said drum for moving radially with respect to said axis of rotation between an engaged position and a disengaged position with respect to said drum, said first and second clutch shoes responsive to acceleration for moving into said engaged position and responsive to high rotational speed for moving into said disengaged position; and biasing means for normally maintaining said first and second clutch shoes in said disengaged position when said spindle is at rest.

17. The clutch of claim 16 further comprising:

said first and second clutch shoes diametrically opposed to one another on opposite diametrical sides of said spindle, each shoe having a rim surface engageable with said drum and a counterweight connected to said rim surface by at least one elongated arm such that said axis of rotation is interposed between said counterweight and said rim portion.

18. The clutch of claim 17 further comprising:

guide means for guiding said first and second shoes in alignment with one another during radial movement between said engaged position and said disengaged position.

19. The clutch of claim 18 further comprising:

said guide means including a radially inwardly extending rib extending from said rim surface of one shoe and cooperatively received within an elongated rib-receiving aperture formed in said counterweight of the other shoe.

20. The clutch of claim 19 further comprising:

a diver block connected to said spindle;

wall means formed in said first and second shoes for receiving said driver block therein; and said guide means further including said wall means having an external surface cooperatively, slidably engaged by said at least one arm of said first and second shoes.

\* \* \* \* \*